US010997614B2

(12) United States Patent
Lei et al.

(10) Patent No.: US 10,997,614 B2
(45) Date of Patent: May 4, 2021

(54) FLEXIBLE FEATURE REGULARIZATION FOR DEMAND MODEL GENERATION

(71) Applicant: Oracle International Corporation, Redwood Shores, CA (US)

(72) Inventors: Ming Lei, Ellicott City, MD (US); Catalin Popescu, Atlanta, GA (US)

(73) Assignee: Oracle International Corporation, Redwood Shores, CA (US)

(*) Notice: Subject to any disclaimer, the term of this patent is extended or adjusted under 35 U.S.C. 154(b) by 231 days.

(21) Appl. No.: 16/155,122

(22) Filed: Oct. 9, 2018

(65) Prior Publication Data

US 2020/0111109 A1   Apr. 9, 2020

(51) Int. Cl.
*G06Q 30/02*   (2012.01)
*G06N 5/02*   (2006.01)

(52) U.S. Cl.
CPC .......... *G06Q 30/0202* (2013.01); *G06N 5/02* (2013.01)

(58) Field of Classification Search
None
See application file for complete search history.

(56) References Cited

U.S. PATENT DOCUMENTS

| 8,738,421 B1* | 5/2014 | Ali | G06Q 30/0202 705/7.29 |
|---|---|---|---|
| 10,002,364 B2 | 6/2018 | Gopinath et al. | |
| 2017/0161640 A1* | 6/2017 | Shamir | G06N 20/00 |
| 2017/0364614 A1* | 12/2017 | Freeman | G06F 30/20 |
| 2019/0156357 A1* | 5/2019 | Palinginis | G06F 17/18 |
| 2019/0259043 A1* | 8/2019 | Koneri | G06N 7/005 |

OTHER PUBLICATIONS

Bae J. Regularization Methods on Almost Ideal Demand System. Available at SSRN 3210692. Jul. 9, 2018 (Year: 2018).*
Zou, Hui, and Trevor Hastie. "Regularization and variable selection via the elastic net." Journal of the royal statistical society: series B (statistical methodology) 67.2 (2005): 301-320 (Year: 2005).*

(Continued)

*Primary Examiner* — Patricia H Munson
*Assistant Examiner* — Marjorie Pujols-Cruz
(74) *Attorney, Agent, or Firm* — Potomac Law Group, PLLC (57) ABSTRACT

Embodiments forecasting future demand for an item. Embodiments receive a regression based demand algorithm for the item that includes the set of features as regression variables and split the data points into a training set and a testing set. Embodiments assign each of the features of the set of features into one of a plurality of regularization categories and assign a penalty parameter to each of the features subject to regularization. Embodiments train the demand algorithm using the training set, the penalty parameters and the features to generate a trained demand model. Embodiments evaluate the trained demand model using the testing set to determine an early drop metric and repeat the assigning each of the features, the assigning the penalty parameter, the training the demand algorithm and the evaluating the trained demand model until the early drop metric meets a threshold.

20 Claims, 3 Drawing Sheets

(56) References Cited

OTHER PUBLICATIONS

Kailash Ahirwar, "What is Regularization in Machine Learning?", Dec. 6, 2017. Retrieved from https://codeburst.io/what-is-regularization-in-machine-learning-aed5a1c36590, 9 pages.
Prashant Gupta, "Regularization in Machine Learning", Nov. 15, 2017. Retrieved from https://towardsdatascience.com/regularization-in-machine-learning-76441ddcf99a, 8 pages.
Wikipedia. "Overfitting". Oct. 5, 2018. Retrieved from https://codeburst.io/what-is-regularization-in-machine-learning-aed5a1c36590, 7 pages.

* cited by examiner

FLEXIBLE FEATURE REGULARIZATION FOR DEMAND MODEL GENERATION

FIELD

One embodiment is directed generally to a computer system, and in particular to a computer system that forecasts demand.

BACKGROUND INFORMATION

Products are typically delivered to consumers through a network of manufacturers, distributors, transporters, retailers, etc. Such a network of facilities that together deliver products to consumers is commonly referred to as a "supply chain" network Suppliers of products (e.g., manufactures, vendors, retailers, etc.) often face the task of forecasting the demand for the products/items in order to provide a smooth and efficient flow of the products through the supply chain network in the presence of constantly-changing market conditions. Overestimating the demand can result in overproduction and increased costs associated with holding inventories (e.g., storage costs, obsolescence, etc.). Underestimating the demand, on the other hand, can result in lost revenues.

Further, in the retail industry, retailers need to predict their demand in the future to better manage their inventory or promotion/markdown planning. Retailers may engage in many types of promotions to boost their sales. To generate an accurate forecast, a retailer has to consider all factors/features which could impact the demand, such as promotions, price, seasonality, weather, etc.

In general, sales forecast systems encounter problems in producing a week-by-week forecast of sales units for retail items. The sales of retail items in a given week is affected by many factors, such as seasonal factors, whether a discount has been applied to a retail item during the week, and at what point in the lifecycle of a merchandise the week falls. One common approach to forecasting weekly sales units involves building a "causal demand model" for retail items. This demand model is a mathematical model that describes weekly sales units in terms of factors such as the ones listed above. The factors are known as the "demand variables" or "demand features" that form a demand model.

The demand model specifies mathematically how the demand variables affect sales units. For example, if the amount of discount is a demand variable, historical data may show that a 50% price cut resulted in a 4-fold increase in sales units (i.e., related to price elasticity). In this example, the demand variable is a 50% price cut and the historical sales data is the 4-fold increase in sales. In order for the causal demand model to be of use in forecasting sales units, it is necessary to determine the relationship of the demand variable (50% price cut) to the sales units (4-fold increase). This relationship is referred to as the "demand parameter" associated with the demand variable.

In this example, the demand parameter may be determined to specify that for every 25% price reduction, sales of a particular retail item will increase by 2-fold. With the demand parameter determined, it is then possible to forecast sales units by specifying the future values of the demand variables. To continue the price cut example, the retailer might know that next season it will be running a 40% price cut during some weeks. The demand model will then forecast sales units for those weeks accounting for the 40% price cut.

The demand parameter is determined by examining historical retail sales data (known as "retail panel data") containing price cuts for the retail item itself, or for similar retail items. However, as noted above, several demand variables affect the sales of retail items. These several demand variables apply simultaneously. For example, a retailer may have performed the 50% price cut during the summer for a summer item, in which case the 4-fold increase in sales may be partially due to an increase in seasonal demand for summer retail items during summer. To separate the effects of the several demand variables on sales, a regression is performed on the demand model to determine values for demand parameters that cause the demand model to best fit retail panel data.

Further, the quality of a sales forecast is very dependent on the quality of the input data (i.e., garbage in, garbage out). In many situations, the historical data necessary and available for sales forecasting is less than adequate, and the resulting forecasts can do more harm than good. Some known sophisticated forecasting solutions offer an exception driven workflow, where such bad forecasts are detected and a forecast analyst is prompted to review and adjust the forecast manually. Less sophisticated solutions do not catch the bad numbers, which can result in over/understock, wrong allocations, bad plans, etc.

SUMMARY

Embodiments forecasting future demand for an item. Embodiments receive historical sales data for the item that includes a plurality of data points and define a set of features for the item. Embodiments receive a regression based demand algorithm for the item that includes the set of features as regression variables and split the data points into a training set and a testing set. Embodiments assign each of the features of the set of features into one of a plurality of regularization categories and assign a penalty parameter to each of the features subject to regularization. Embodiments train the demand algorithm using the training set, the penalty parameters and the features to generate a trained demand model. Embodiments evaluate the trained demand model using the testing set to determine an early drop metric and repeat the assigning each of the features, the assigning the penalty parameter, the training the demand algorithm and the evaluating the trained demand model until the early drop metric meets a threshold. Embodiments use the trained demand model to determine a demand forecast for the item, the demand forecast including a prediction of future sales data for the item. Embodiments then electronically send the demand forecast to an inventory management system which is configured to generate shipments of additional quantities of the item to a plurality of retail stores based on the demand forecast.

DETAILED DESCRIPTION

One embodiment uses a regression based demand model for demand forecasting of an item. Embodiments use regularization for features of the item so that some of the features are "penalized" in order to avoid an overfitting of the demand model. Embodiments provide flexibility so that the weighing of different features can be varied, and different regularization algorithms can be used on different features.

Sales and demand forecasting methods can roughly be grouped into judgmental, extrapolation and causal methods. Extrapolation methods use only the time series data of the activity itself to generate the forecast. Known particular algorithms/methods range from the simpler moving averages and exponential smoothing methods to the more complicated Box-Jenkins approach. While these known methods identify and extrapolate time series patterns of trend, seasonality and autocorrelation successfully, they do not take external factors such as price changes and promotion into account.

Vector Auto Regression ("VAR") methods extend the Box-Jenkins methods to include other variables, but their complexity makes estimation difficult. Causal forecasting involves building quantitative models using inputs representing the phenomena that are believed to be drivers of the outcome. The methods can be as simple as a linear regression algorithm with promotion variables. A starting point is a regression model with promotion variables such as price cuts, rebates or advertisements. The idea is that model simplicity helps managers to understand and approve or guide modification of the models, and as they become more knowledgeable about a decision aid, they may be ready to implement more sophisticated and complex models.

In order to improved demand forecasting, retailers have begun to move to modern machine learning technologies, such as support vector machine ("SVM"), artificial neural network ("ANN"), random forest, and so on. However, typically a retailer will just pick one model for each product/location. As used herein, a retailer can include a single retail store, or can include a large amount of retail stores all integrated and managed by single or multiple logistic operations.

Further, for many machine learning algorithms (SVM, ANN, random forest, etc.), retailers will use a feature set (i.e., various attributes of an item) to define the data point at the product/location/calendar intersection. In these algorithms, retailers will train the model with the same feature set as it does for forecasting. Further, the same feature set could be used by several different algorithms for forecasting. A "feature set" is the collection of features that impact the demand or sales for an item as well as describe attributes of an item. Examples of features include base sales, price, seasonality, brand, promotions, size, color, pack size, supplier, length, etc. While features such as price and seasonality may be relevant for all types of products, some others are item specific. For example, pack size impacts the demand for yogurts, however the length of the pack is insignificant. Conversely, the brand is very important for fashion items, but is much less important for hardware items, such as nails or hammers.

The following terms apply to embodiments of the invention:

The term "item" or "retail item", as used herein, refers to merchandise sold, purchased, and/or returned in a sales environment. The terms "particular item" and "single item" are used interchangeably herein and refer to a particular item type (e.g., to a particular type of cellular telephone such as an iPhone 8), not to a unit item.

The terms "period", "time period", "retail period", or "calendar period", as used herein, refer to a unit increment of time (e.g., a 7-day week) which sellers use to correlate seasonal periods from one year to the next in a calendar for the purposes of planning and forecasting. The terms may be used interchangeably herein.

The term "sales channel" or "location" or "retail location", as used herein, may refer to a physical store where an item is sold, or to an online store via which an item is sold.

The term "sales data", as used herein, refers to historical sales and promotion information that has been recorded for an item that has been sold in past retail periods (e.g., over 52 weeks of the past year). Sales data may include, for example, a number of units (or a monetary amount) of an item sold in each retail period, along with data characterizing one or more types of promotions for the item. Sales data may be stored in a database, for example.

The terms "promotion" and "sales promotion" are used interchangeably herein and refer to a particular type of promotion for an item. Some examples of promotion components may include a price discount promotion component, a television advertisement component, a radio advertisement component, a newspaper advertisement component, an internet advertisement component, an email advertisement component, and an in-store advertisement component.

The term "promotion effect" refer to a numerical value that characterizes the effect (e.g., the effect on sales and profitability) of promoting an item. For example, an estimated promotion effect of 2.0 may indicate that a promotion, or combination or promotions, is estimated to result in twice as many sales (a 100% increase) for an item. Promotion effects (i.e., values) may be used in a demand forecast model to forecast a demand for an item. Promotion effects may also be used in a computerized inventory system to control various aspects of inventory for an item.

Embodiments, in general, utilize the following demand model or function for demand forecasting ("equation (1)"):

$$\text{Demand} = \text{base demand} * \text{seasonality} * \text{promo effects} \\ (* \text{additional features effects}) \quad (1)$$

Where "base demand" is the historical demand without taking account any effects or other factors, seasonality is the impact on demand based on the season (i.e., time of year), and promo effects are the effects on demand based on one or more promotions offered during a time period. Any or all additional features/variables that impact demand can be added to the model as appropriate. However, the number of features could exceed 100 in some situations.

Each of these features can be used to model the demand forecast as a linear regression model. Embodiments use linear regression with regularization to model the demand. Embodiments first identify the features that impact the demand. Embodiments then quantify how much the features impact the demand. Linear regression is used to determine this relationship between features and demand.

Figure 1:
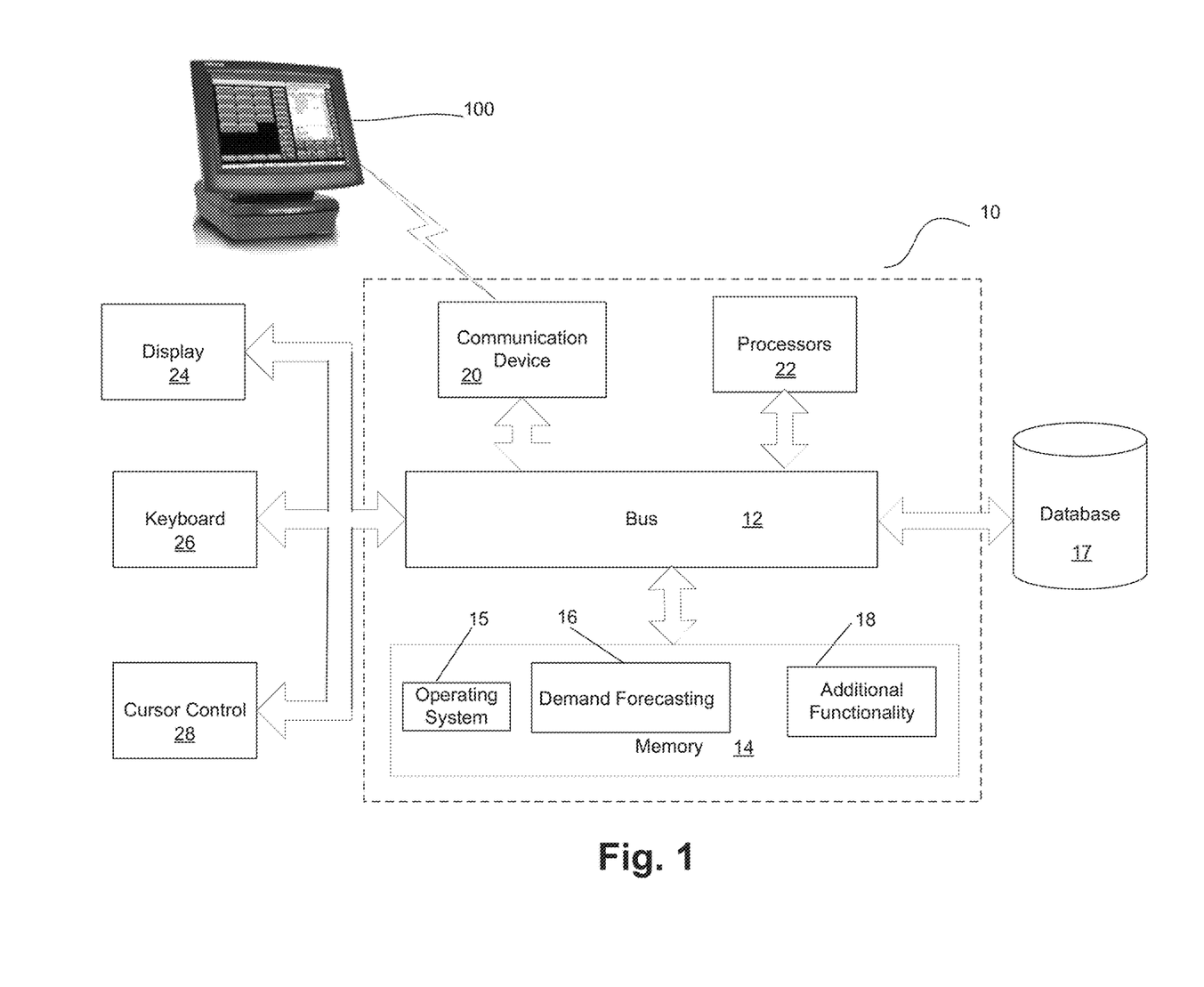
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a server, system 10 may need to include a processor and memory, but may not include one or more of the other components shown in FIG. 1, such as a keyboard or display.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), a static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a demand forecasting module 16 that used regularization to weight demand features for demand forecasting, and all other functionality disclosed herein. System 10 can be part of a larger system. Therefore, system 10 can include one or more additional functional modules 18 to include the additional functionality, such as a retail management system (e.g., the "Oracle Retail Demand Forecasting System" or the "Oracle Retail Advanced Science Engine" ("ORASE") from Oracle Corp.) or an enterprise resource planning ("ERP") system. A database 17 is coupled to bus 12 to provide centralized storage for modules 16 and 18 and store customer data, product data, transactional data, etc. In one embodiment, database 17 is a relational database management system ("RDBMS") that can use Structured Query Language ("SQL") to manage the stored data. In one embodiment, a specialized point of sale ("POS") terminal 100 generates the transactional data and historical sales data (e.g., data concerning transactions of each item/SKU at each retail store) used to forecast demand. POS terminal 100 itself can include additional processing functionality to forecast demand in accordance with one embodiment and can operate as a specialized demand forecasting system either by itself or in conjunction with other components of FIG. 1.

In one embodiment, particularly when there are a large number of retail stores, a large number of items, and a large amount of historical data, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

Embodiments are disclosed from the perspective that, for an item (i.e., a class of items such as yogurt or men's shirts) sold at a location (e.g., a retail location), the item may be promoted in various ways at various times (i.e., pre-defined retail periods, such as a day, week, month, year, etc.). A retail calendar has many retail periods (e.g., weeks) that are organized in a particular manner (e.g., four (4) thirteen (13) week quarters) over a typical calendar year. A retail period may occur in the past or in the future. Historical sales/performance data may include, for example, a number of units of an item sold in each of a plurality of past retail periods as well as associated promotion data (i.e., for each retail period, which promotions were in effect for that period) and any other relevant demand features/variables.

As disclosed below, embodiments use one or more trained models generated from one or more different algorithms and one or more feature sets, and may ultimately combined the forecast from multiple trained models to arrive at a final demand forecast. Trained models used in some embodiments can include trained linear regression models or machine learning techniques, such as decision or regression trees, Support Vector Machines ("SVM") or neural networks.

In connection with trained linear regression models, generated from a linear regression algorithm trained with different inputs and feature sets, the search for a linear relationship between an output variable and multiple input variables has resulted in stepwise selection of input variables in a regression setting. In some embodiments, the goal is to build a function that expresses the output variable as a linear function of the input variables plus a constant. Two general approaches in stepwise regression are forward and backward selection.

In forward selection, variables are introduced one at a time based on their contribution to the model according to a pre-determined criterion. In backward selection, all input variables are built into the model to begin with, and then input variables are removed from the regression equation if they are judged as not contributing to the model, again based on a predetermined criterion.

In machine learning, SVMs are supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier. An SVM model is a representation of the examples as points in space, mapped so that the examples of the separate categories are divided by a clear gap that is as wide as possible. New examples are then mapped into that same space and predicted to belong to a category based on which side of the gap they fall.

In addition to classification, SVMs have been successfully applied in sales or demand forecasting, being able to process common metrics, such as sales, as well as price, promotions, external factors such as weather and demographic information.

SVM and its regression version of Support Vector Regression ("SVR") implicitly map instances into a higher dimensional feature space using kernel functions. In its most basic form, SVR ideally seeks to identify a linear function in this space that is within a distance to the mapped output points. This "soft margin formulation" allows and penalizes deviations beyond the pre-determined distance, and minimizes the sum of violations along with the norm of the vector that identifies the linear relationship A regression tree technique partitions the data into smaller subsets in a decision tree format and fits a linear regression model at every leaf that is used to predict the outcome. Alternative model tree approaches differ from each other mainly in the choice criteria of the input variable to be branched on, split criteria used, and the models constructed at every leaf of the tree. While trees are transparent in the sense that the prediction for a particular case can be traced back to the conditions in the tree and the regression function that is applicable for cases that satisfy those conditions, trees with many layers are not easy to interpret in a generalizable manner.

An Artificial Neural Network ("ANN") is an information processing paradigm that is inspired by the way biological nervous systems, such as the brain, process information. The key element of this model is the novel structure of the information processing system. It is composed of a large number of highly interconnected processing elements (i.e., neurons) working in unison to solve specific problems. ANNs learn by example. An ANN is configured for a specific application, such as pattern recognition or data classification, through a learning process. Learning in biological systems involves adjustments to the synaptic connections that exist between the neurons. This is true of ANNs as well. Since neural networks are best at identifying patterns or trends in data, they are well suited for prediction or forecasting needs.

As disclosed, various algorithms can be used to predict future demand and these algorithms are then used to train a model that can forecast demand for an item. However, that are issues when a well trained model becomes a too well trained model, particularly with a linear regression model. For example, if a machine learning model fits a data set very well, there may be "overfitting", and such a model loses its prediction power when used to forecast with a different data set. Specifically, overfitting is the production of an analysis that corresponds too closely or exactly to a particular set of data, and therefore may fail to fit additional data or predict future observations reliably. An overfitted model is a statistical model that contains more parameters than can be justified by the data. The essence of overfitting is to have unknowingly extracted some of the residual variation (i.e., the noise) as if that variation represented underlying model structure.

In general, a linear regression for demand forecasting can be expressed as follows:

$$Y \approx \beta 0 + \beta 1 X 1 + \beta 2 X 2 + \ldots + \beta p X p$$

Where "Y" represents the learned relation and $\beta$ represents the coefficient estimates for different demand variables/features that are predictive of demand, such as base sales, price, seasonality, brand, promotions, size, color, pack size, supplier, length, etc. A fitting procedure involves a loss function, known as residual sum of squares or RSS. The coefficients are chosen, such that they minimize this loss function as follows:

$$RSS = \sum_{i=1}^{n} \left( y_i - \beta_0 - \sum_{j=1}^{p} \beta_j x_{ij} \right)^2.$$

To address overfitting, "regularization" is frequently used. Widely used regularization includes the L1 regularization (i.e., "Lasso Regression"), L2 regularization (i.e., "Ridge Regression") and a combination, the L1+L2 regularization (i.e., "Elastic Net"). For example, Ridge Regression is illustrated as follows:

$$\sum_{i=1}^{n} \left( y_i - \beta_0 - \sum_{j=1}^{p} \beta_j x_{ij} \right)^2 + \lambda \sum_{j=1}^{p} \beta_j^2 = RSS + \lambda \sum_{j=1}^{p} \beta_j^2$$

where the RSS is modified by adding the shrinkage quantity. Now, the coefficients are estimated by minimizing this function. Here, $\lambda$ is the tuning parameter that decides how much the flexibility of the model is penalized. When $\lambda=0$, the penalty term has no effect, and the estimates produced by Ridge Regression will be equal to least squares. However, as $\lambda \to \infty$, the impact of the shrinkage penalty grows, and the Ridge Regression coefficient estimates will approach zero.

These known regularization techniques weigh all features the same. In other words, the same penalty applies to all features during regularization. However, for retail item demand forecasting, the qualitative and quantitative importance of features differs, and should be penalized differently. For example, the price of some items (e.g., a red t-shirt) may be more important than the country in which it was produced, and for others (e.g., free trade coffee) the opposite is the case.

Therefore, embodiments are directed to novel regularization for linear regression, which allows users to specify penalty terms differently based on the feature. Specifically, embodiments address overfitting of retail demand forecasting models by differently penalizing each of the features that characterize an item. The importance is specified through the penalty term of regularization. If a certain feature should be considered to a larger extent than others, the penalty is less than the penalty term of the others. This enables the flexibility in a demand forecasting system to include business logic in the analytics, by specifying the importance of available features.

For purposes of the below disclosed functionality the following will apply: In embodiments, the L1 regularization formula is as follows:

$$w^* = \underset{w}{\operatorname{argmin}} \sum_j \left( t(x_j) - \sum_{i=1}^k w_i h_i(x_j) \right)^2 + \lambda \sum_{i=1}^k |w_i|$$

In embodiments, the L2 regularization formula is as follows:

$$w^* = \underset{w}{\operatorname{argmin}} \sum_j \left( t(x_j) - \sum_{i=1}^k w_i h_i(x_j) \right)^2 + \mu \sum_{i=1}^k w_i^2$$

In embodiments, the Elastic Net regularization formula is as follows:

$$w^* = \underset{w}{\operatorname{argmin}} \sum_j \left( t(x_j) - \sum_{i=1}^k w_i h_i(x_j) \right)^2 + \lambda \sum_{i=1}^k |w_i| + \mu \sum_{i=1}^k w_i^2$$

And embodiments use the following formula, which expresses a portion of the functionality of FIG. 2 below ("equation 2"):

$$w^* = \underset{w}{\operatorname{argmin}} \sum_j \left( t(x_j) - \sum_{i=1}^k w_i h_i(x_j) \right)^2 + \sum_{i=1}^k \lambda_i |w_i| + \sum_{i=1}^k \mu_i w_i^2 \quad (2)$$

Where $w_i$ are the estimated effects of feature (i), $t(x_j)$ is the target value of observation (j) (in embodiments it is the sales of week j). $h_i(x_j)$ is the observation (j)'s feature (i)'s value. $\lambda$ is the penalty parameter in the L1 regularization which applies to all features. $\mu$ is the penalty parameter in the L2 regularization which also applies to all features. In embodiments, the $\lambda_i$'s denote the penalty parameters for the feature (i) for the L1 regularization, the $\mu_i$'s denote the penalty parameters for the feature (i) for the L2 regularization.

Figure 2:
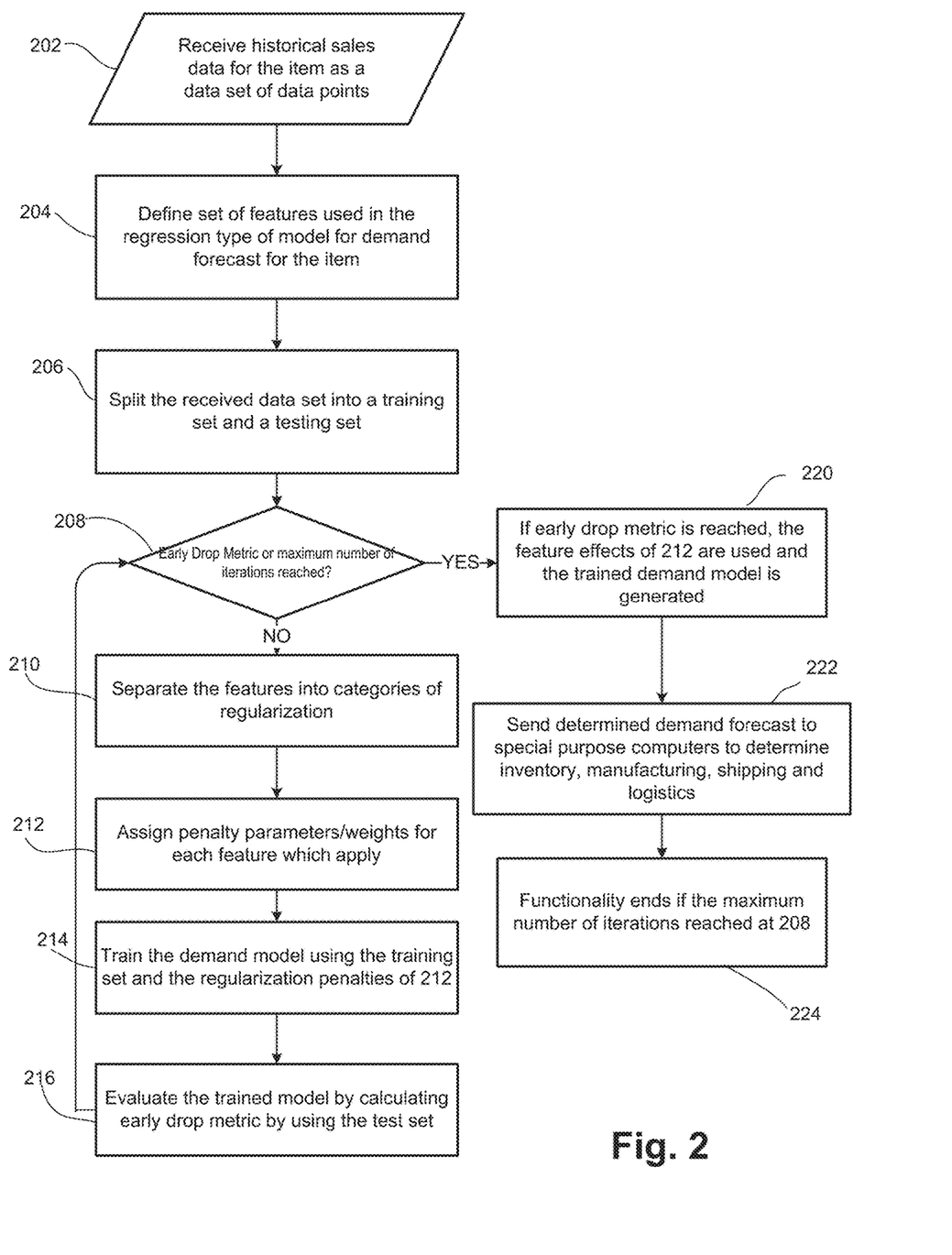
FIG. 2 is a flow diagram of the functionality of a demand forecast module of FIG. 1 when penalizing features for regularization for regression that can be used for a demand forecast in accordance with one embodiment.

FIG. 2 is a flow diagram of the functionality of demand forecast module 16 of FIG. 1 when penalizing features for regularization for regression that can be used for a demand forecast in accordance with one embodiment. In one embodiment, the functionality of the flow diagram of FIG. 2 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202, historical item sales data is received for all items for all stores for a particular class/category of products, or for only a single item of interest. For example, the class/category can be "yogurt", "coffee" or "milk." Each class has one or more subclasses, all the way down to the SKU or Universal Product Code ("UPC") level, which would be each individual item for sale. For example, for the class of yogurt, a sub-class could be each brand of yogurt, and further sub-classes could be flavor, size, type (e.g., Greek or regular), down to an SKU which would correspond to every individual different type of yogurt item sold.

Historical sales and performance data may include, for example, data representing past sales and promotions of an item across a plurality of past retail sales periods. The historical performance data may be segmented into retail periods of past weeks, with each past week having numerical values assigned to it to indicate the number of items sold for that week. The historical performance data may also include numerical values representing price discounts and values of other promotion components across the retail periods, in accordance with one embodiment. The historical performance data for an item may be accessed via network communications, in accordance with one embodiment, including being accessed from each POS terminal 100 at each retail store and/or accessed from database 17.

The historical performance data includes sales data associated with the plurality of promotion components across a plurality of time periods (e.g., weeks). Examples of promotion components include, but are not limited to, a price discount component, a television advertisement component, a radio advertisement component, a newspaper advertisement component, an email advertisement component, an internet advertisement component, and an in-store advertisement component. The historical data includes, for each item, a listing of feature/variables/attributes for the item, such as price, promotions, seasonality, brand, color, style, etc.

The historical sales data is received as multiple data points or a "data set", with a single data point for each sales of an item per store. For example, for 202, assume there are 100 k data points of item/store/week sales data for a given item/store (location). The functionality of FIG. 2 is used to forecast the demand for the item based on those received data points.

At 204, the set of features which will be used in the regression type of demand model for demand predictions is received/defined. For example, assume the item is yogurt, and the feature set includes 10 features: seasonality, price, brand, package size, item size, flavor, color, in-store display, end cap and a buy one get one free ("Bogo") promotion (i.e., feature numbers x0, x1, . . . x9). The set of features could be a subset, or all the features in the data set. Embodiments than implement regularization to determine which feature is relevant and penalize or give less importance to features that are less relevant.

At 206, the data set received at 202 is split into two subsets, a training set and a testing set. In one embodiment, 80% of the data points are in the training set, and 20% of the data points are in the testing set. In one embodiment, the data set is randomly split into either the training set or testing set.

Embodiments receive an early drop metric, such as a MAPE (Mean absolute percentage error) metric and a maximum iteration value (e.g., any positive number). In one embodiment, a 10% MAPE is used, and the maximum iteration value is 1000. At 208, it is determined if the early drop metric has been reached, and/or if the maximum iteration has been reached. When 208 is executed the first time, none of these metrics will have been reached and the functionality continues to 210.

At 210, each of the features of the set of features are assigned into one of multiple regularization categories. The assignment can be random in one embodiment. In another embodiment, business logic can also be used, which can be implemented by machine learning/artificial intelligence, or a user can assign manually. For example, if it is known that the brand is a very important feature for a shirt, machine learning may choose to assign color to the "None" category so that this important feature will not be penalized at all.

In embodiments, the categories include L1, L2, Elastic Net, or none, and in the above example the 10 features are separated as follows:

| Separate the features into 4 categories | |
| --- | --- |
| Type | Features |
| L1 | x2, x5, x7 |
| L2 | x1, x3, x0 |
| Elastic Net | x4, x6 |
| None | x8, x9 |

At 212, for each regularization category at 210, penalty parameters (i.e., weights) are set for each feature which apply. As disclosed above, in embodiments, penalty parameters for L1 are indicated as and penalty parameters for L2 are indicated as μ. The penalties can be inputs determined by the user, or can be automatically generated using machine learning/artificial intelligence. For instance, an important feature may get a lesser penalty than a less important feature. The more important the feature, the smaller the penalty. In the example, the penalties are assigned as follows:

| Assign the regularization penalty for each feature as below | | |
| --- | --- | --- |
| Feature | λ(L1) | μ(L2) |
| x0 | | 0.011 |
| x1 | | 0.012 |
| x2 | 0.001 | |
| x3 | | 0.023 |
| x4 | 0.02 | 0.03 |
| x5 | 0.01 | |
| x6 | 0.024 | 0.013 |
| x7 | 0.0005 | |
| x8 | 0 | 0 |
| x9 | 0 | 0 |

At 214, the demand model is trained using the training set and using the regularization penalties/weights of 212. The equation 2 regularization formula above is used to determine the effects of each feature to train the demand model.

At 216, the model is evaluated using the test set to determine the early drop metric (i.e., MAPE). In the example above, the resulting MAPE is 25%. Specifically, from 214 the effects for features X0 thru X9 are now known. Embodiments then calculate the demand forecast prediction for the items in the test set as prediction=effect(X0)*effect(X1) . . . effect(X9). The actual values for the test data set are also known. With the actual values and the predicted values, an error metric (i.e., MAPE) is calculated.

In this example, the functionality then continues to 208, where the 25% is greater than the early drop metric of 10%. Therefore, at least another iteration of 210, 212, 214 and 216 are executed. In one embodiment, each iteration is independent and does not rely on previous results.

In the example, for the second iteration, at 210 the features are separated as follows:

| Separate the features into 4 categories | |
| --- | --- |
| Type | Features |
| L1 | x2, x5, x9 |
| L2 | x1, x3 |
| Elastic Net | x0, x6, x7 |
| None | x4, x8 |

In the second iteration, at 212, the penalties are assigned as follows:

| Assign the regularization penalty for each feature as below | | |
| --- | --- | --- |
| Feature | λ(L1) | μ(L2) |
| x0 | 0.05 | 0.002 |
| x1 | | 0.015 |
| x2 | 0.02 | |
| x3 | | 0.06 |
| x4 | 0 | 0 |
| x5 | 0.06 | |
| x6 | 0.02 | 0.1 |
| x7 | 0.03 | 0.04 |
| x8 | 0 | 0 |
| x9 | 0.1 | |

In the second iteration, at 214 the demand model is trained using the data set, and at 216, the model is evaluated using the test set. In this example, the calculated MAPE is 9% for the second iteration.

At 208, since the MAPE is now below the early drop metric of 10% (or if the number if iterations was reached at 208), the functionality moves to 220.

At 220, if the early drop metric was reached, the feature effects calculated in the last iteration are used to determine a demand forecast. Therefore, in the example, the output of the training from FIG. 2 are the effects of the 10 features, effect(X0) thru effect(X9). The effects are used to predict forecast demand, as Predict=effect(x0)*effect(x1) . . . effect (x9).

At 222, the determined demand forecast from 220 is used for manufacturing production, shipping logistics, and inventory control. The determined demand forecast is sent to other specific purpose computers in one embodiment, such as an inventory control system, a manufacturing system, a shipping and logistics system, and a sales assistance system. The determined demand forecast in one embodiment is in the form of individual data bits that have been translated from the demand forecast and that are stored and transmitted to other specialized computer systems, where they are stored and utilized by those systems. As a result, additional items may be manufactured, stored, shipped, etc. and items can be optimally priced.

If the maximum number of iterations is reached without the early drop metric being reached, the functionality ends at 224 without provided a determined demand forecast at 220. In one embodiment, the early drop metric may then be increased and/or the number of iterations may be increased and then functionality may continue at step 206.

An example of 216, where the early drop metric is MAPE, is as follows:

$$MAPE = \frac{100}{N} \sum_{i=1}^{N} \frac{|\text{predicted value}(i) - \text{actual value}(i)|}{|\text{actual value}(i)|}$$

Suppose there are three time periods, which would make N=3. Assume that the predicted values for the three periods are:

Predicted value(i=1)=3

Predicted value(i=2)=2

Predicted value(i=3)=1

Assume that the actual values are:

Actual value($i=1$)=1

Actual value($i=2$)=2

Actual value($i=3$)=3

The formula then becomes:

$$MAPE = \frac{100}{3}\left(\frac{|3-1|}{1} + \frac{|2-2|}{2} + \frac{|1-3|}{3}\right)\% = \frac{8*100}{9}\% = 88.89\%.$$

Figure 3:
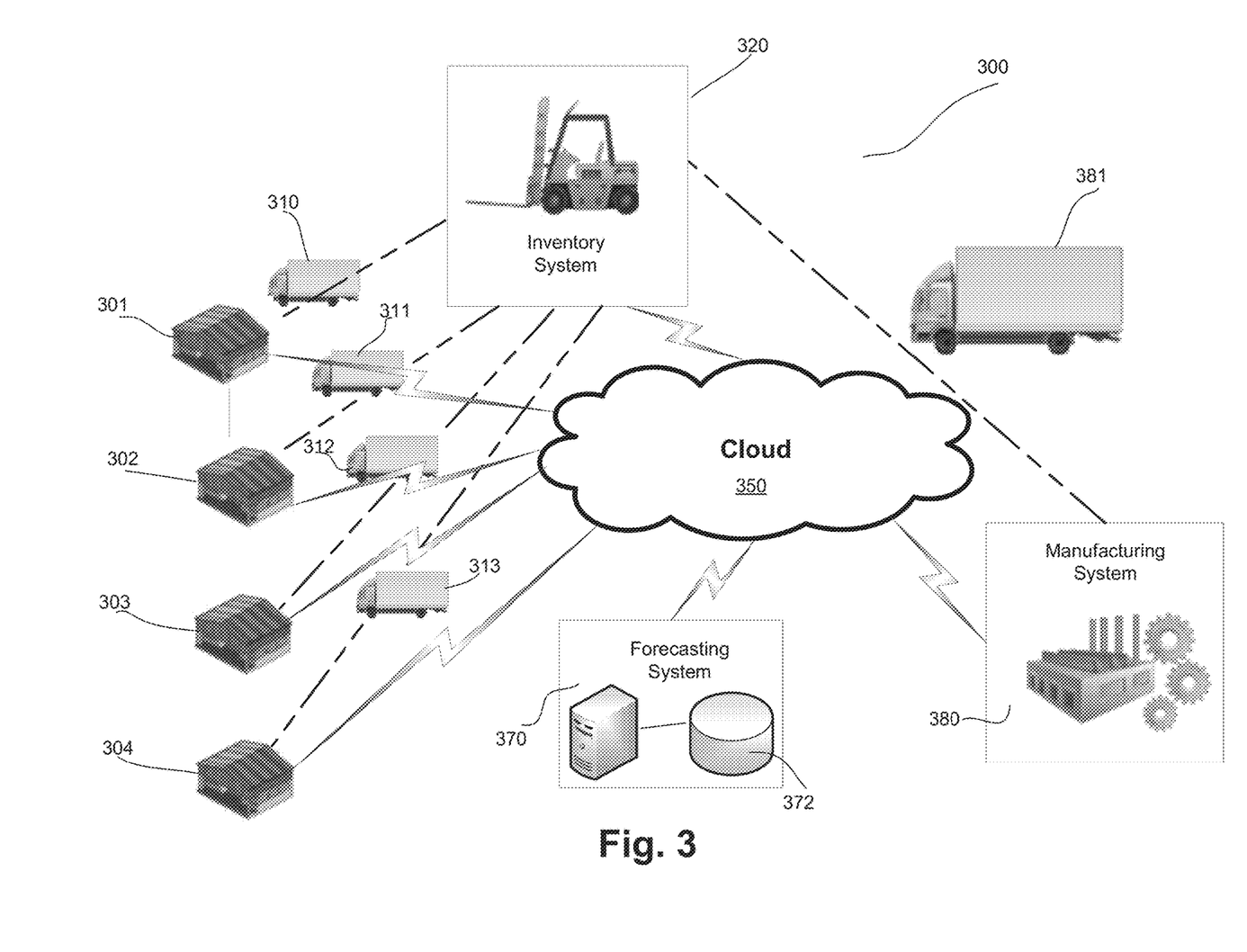
FIG. 3 illustrates an integrated manufacturing, inventory and logistics system that includes demand forecasting as disclosed herein in accordance with one embodiment.

FIG. 3 illustrates an integrated manufacturing, inventory and logistics system 300 that includes demand forecasting as disclosed herein in accordance with one embodiment. As shown in FIG. 3, system 300 can include a product forecasting system 370 that forecasts future product demand and in some instances forecasts and/or considers future demand for hundreds of thousands of products, or in some applications tens of millions or more products at one or more retail stores 301-304. Forecasting system 370 is in communication through a cloud network 350 or other type of communications network with one or more inventory systems 320 and one or more manufacturing systems 380.

Forecasting system 370 generates demand forecasting by implementing the functionality disclosed in conjunction with FIG. 2 above. Inventory system 320 stores inventory and provides transportation logistics to deliver items to stores 301-304 using trucks 310-313 or some other transportation mechanisms. Inventory system 320 in one embodiment implements an Enterprise Resource Planning ("ERP") specialized computer system or a specialized inventory control system that uses input from forecasting system 310 to determine levels of inventories and the amount and timing of the delivery of items to stores 301-304.

Manufacturing system 380 manufactures items to be sent to inventory system 320 and provides transportation logistics to deliver the items to inventory system 320 using a truck 381 or some other transportation mechanisms. Manufacturing system 380 in one embodiment implements an ERP specialized computer system or a specialized manufacturing system that uses input from forecasting system 370 to determine an amount of items to manufacture, inventory of resources that are used for the manufacturing, and the amount and timing of the delivery of items to inventory system 320.

Forecasting system 370 can utilize information from inventory system 320, a sales tracking system (not shown) and/or databases in forecasting demand for products. In forecasting demand, forecasting system 370 attempts to predict uncharacteristic demand of one or more products that results from events, weather, social demand, economic factors and other factors. Tens, to hundreds to thousands of different variables may be tracked that can have an effect on the demand of one or more products. Changes in these variables can result in uncharacteristic demands. For example, changes in forecasted weather can be tracked, and one or more variables associated with the forecasted weather can be used in determining whether such a change is weather may have an effect on demand, and may further forecast a change in demand.

In general, the elements of FIG. 3 perform sales, manufacturing, or consumption of inventory. Retail locations/stores 301-304 for direct consumer sales exhibit the most volatile inventory patterns, due to the random nature and external factors affecting sales. However, manufacturing facilities and sites that consume inventory (such as product integrators, internet shippers, etc. products used in the local facility) also benefit from demand forecasting as disclosed herein. As disclosed, each retail location 301-304 sends sales data and historic forecast data to forecasting system 370. The sales data includes inventory depletion statistics for each item, or SKU/UPC for each sales period, typically days, in the previous sales cycles (i.e. weeks), typically 4-7 weeks of inventory cycles.

Forecasting system 370 stores the sales data in a repository 372, and employs the sales data for generating orders to replenish inventory. The orders include a set of items and a quantity for each item for maintaining the inventory level at a store 301-304.

Many retail ordering schemes rely on days of the week for sales periods and sales cycles. In one configuration, in an inventory management environment having inventory statistics, in which the inventory statistics are specific to each day of the week, inventory system 320 determines target inventory levels by gathering, for each day of the week, inventory level statistics from previous sales. Embodiments compute, based on the inventory level statistics, an inventory level for each day of the week, such that the safety stock accommodates variations in inventory between the different days of the week. Embodiments render, for each of a plurality of items, a stocking level indicative of the target inventory level including the safety stock for each day of the week. Embodiments compute an ordering quantity based on a lead time such that the ordered quantity arrives to satisfy the rendered stocking level on the determined day of the week. Identifying the actual stock levels includes identifying stock levels on the day of the week from previous weeks from the history data, thus focusing on the same day of the week over time, rather than an average of all days in the week.

In particular configurations, the disclosed embodiments may be employed in conjunction with specialized and/or particularly high volume retail sales environments. In large logistics and distribution operations, it is beneficial to load trucks as full as possible, and in the event deferral of items to a successive trip is needed, to select those items which will have a least likely chance of interrupting sales activity. Accordingly, embodiments are operable in conjunction with POS system 100 to identify high velocity or high turnover items that tend to be sold and replenished faster than other items. A UPC bar code symbol or radio-frequency identification ("RFID") on an item includes a field, designation or value, that alone or in conjunction with a database lookup, designates an item as a high velocity item appropriate for safety stock treatment as defined herein.

A high velocity item may be accommodated by identifying, for each of a plurality of items represented in an inventory database, a field for a product identifier and a field denoting a safety stock for the item, and determining, for each of the product identifiers, a product segmentation field based on product velocity indicative of increased product replenishment demands resulting from a sales volume. The disclosed embodiments determine based on the velocity field, whether to compute a safety stock, i.e. whether the overhead and burden to resupply according to the safety stock is worthwhile given the product throughput.

In other embodiments, supply logistics may invoke a delivery frequency higher than one truck a day, hence triggering a resupply window with a higher granularity. In such a case, the safety stock may be more specific than an individual day, such as a Monday AM and Monday PM, or to designate multiple delivery or time windows within a particular day of the week, such as 7:00 AM, 11:00 AM and 4:00 PM.

Embodiments, including the generated demand forecast, may be employed in implementing supply logistics and designating deliveries (i.e., trucks) and manifest (i.e., contained items) in accordance with demand and profit margins of the transported items. High velocity items might be deemed to have priority space on a particular delivery, but could further be selected based on a profit margin or markup on the included items, and items with the greatest revenue generation potential selected for inclusion.

In such a product inventory shipping environment that uses the demand forecast disclosed herein and has a plurality of transport vehicles, each vehicle (e.g., truck) is configured for receiving a fixed payload of items for delivery to a sales location for inventory replenishment. Embodiments can provide guidance in loading a delivery vehicle, by, for each item of a plurality of items including a first item and a second item, computing a safety stock and determining, based on the computed safety stock of the first item and the second item, a quantity of each of the first item and the second item to be loaded into the delivery vehicle. Embodiments recompute a truck loading quantity based on the safety stock if insufficient space is available in the delivery vehicle for the determined quantity of the first item and the second item, meaning that certain items would need to be omitted and deferred to a successive delivery.

As disclosed, embodiments provide regularization for demand forecasting by using varied weights for different demand features in the penalty term for different regularization techniques. Having varied weights in the penalty term gives the user more control during the model training in order to achieve more accurate demand prediction. Further, the flexible weighting approach differs from known regularization techniques, where the user can only specify one weight for all features. Further, known solutions allow one of lasso, or ridge, or elastic net, but not a combination of different regularization methods. In contrast, with embodiments, the system has the flexibility to implement ridge regularization for some features, lasso regularization for others, and elastic net regularization for the rest. Or the system can not run regularization at all for certain features, all controlled by the penalty term.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method for forecasting future demand for an item, the method comprising:
receiving historical sales data for the item comprising a plurality of data points;
defining a set of features for the item comprising a plurality of different features that correspond to the item;
receiving a regression based demand algorithm for the item that includes the set of features as regression variables;
splitting the data points into a training set and a testing set;
assigning each of the features of the set of features into one of a plurality of different regularization categories;
assigning a penalty parameter to each of the features subject to regularization, wherein each individual feature is assigned to a corresponding regularization category and a corresponding penalty;
training the demand algorithm using the training set, the penalty parameters and the features to generate a trained demand model; and
evaluating the trained demand model using the testing set to determine an early drop metric;
repeating the assigning each of the features, the assigning the penalty parameter, the training the demand algorithm and the evaluating the trained demand model until the early drop metric meets a threshold, the repeating resulting in at least a first individual feature assigned to a second regularization category that is different than a previously assigned first regularization category, each of the first regularization category and the second regularization category comprising one of Lasso Regression (L1 regularization), Ridge Regression (L2 regularization) or Elastic Net regularization, and at least a second feature assigned to a second different penalty parameter than as previously assigned, the repeating causing the demand algorithm to be trained at least a second time based on newly assigned features and penalty parameters; and
using the trained demand model, determining a demand forecast for the item, the demand forecast comprising a prediction of future sales data for the item.

2. The method of claim 1, wherein the trained demand model comprises a relationship of demand to each of features of the set of features.

3. The method of claim 1, wherein training the demand algorithm using the training set, the penalty parameters and the features to generate a trained demand model comprises:

$$w^* = \underset{w}{\mathrm{argmin}} \sum_j \left( t(x_j) - \sum_{i=1}^k w_i h_i(x_j) \right)^2 + \sum_{i=1}^k \lambda_i |w_i| + \sum_{i=1}^k \mu_i w_i^2$$

wherein $w_i$ are an estimated effects of feature(i), $t(x_j)$ is a target value of observation(j), $h_i(x_j)$ is the observation(j)'s feature (i)'s value, $\lambda$ is a penalty parameter in an L1 regularization and $\mu$ is a penalty parameter in an L2 regularization.

4. The method of claim 1, wherein the using the trained demand model comprises: prediction=effect(X0)* effect(X1) . . . effect(X9), wherein effect(Xn) comprises a demand effect for feature n of the set of features.

5. The method of claim 1, wherein the early drop metric comprises a mean absolute percentage error.

6. The method of claim 1, further comprising:
receiving a maximum iteration; and
repeating the assigning each of the features, the assigning the penalty parameter, the training the demand algorithm and the evaluating the trained demand model until the maximum iteration is reached.

7. The method of claim 1, wherein the set of features include at least one of price, promotion, seasonality, brand, color or style, further comprising:
electronically sending the demand forecast to an inventory management system which determines quantities of the item to be shipped to each of a plurality of retail stores based on the demand forecast; and
shipping the quantities of the item to each of the plurality of retail stores.

8. A non-transitory computer-readable medium having instructions stored thereon that, when executed by a processor, cause the processor to forecast future demand for an item, the forecasting comprising:
 receiving historical sales data for the item comprising a plurality of data points;
 defining a set of features for the item comprising a plurality of different features that correspond to the item;
 receiving a regression based demand algorithm for the item that includes the set of features as regression variables;
 splitting the data points into a training set and a testing set;
 assigning each of the features of the set of features into one of a plurality of different regularization categories;
 assigning a penalty parameter to each of the features subject to regularization, wherein each individual feature is assigned to a corresponding regularization category and a corresponding penalty;
 training the demand algorithm using the training set, the penalty parameters and the features to generate a trained demand model; and
 evaluating the trained demand model using the testing set to determine an early drop metric;
 repeating the assigning each of the features, the assigning the penalty parameter, the training the demand algorithm and the evaluating the trained demand model until the early drop metric meets a threshold, the repeating resulting in at least a first individual feature assigned to a second regularization category that is different than a previously assigned first regularization category, each of the first regularization category and the second regularization category comprising one of Lasso Regression (L1 regularization), Ridge Regression (L2 regularization) or Elastic Net regularization, and at least a second feature assigned to a second different penalty parameter than as previously assigned, the repeating causing the demand algorithm to be trained at least a second time based on newly assigned features and penalty parameters; and
 using the trained demand model, determining a demand forecast for the item, the demand forecast comprising a prediction of future sales data for the item.

9. The computer-readable medium of claim 8, wherein the trained demand model comprises a relationship of demand to each of the features of the set of features.

10. The computer-readable medium of claim 8, wherein training the demand algorithm using the training set, the penalty parameters and the features to generate a trained demand model comprises:

$$w^* = \underset{w}{\operatorname{argmin}} \sum_j \left( t(x_j) - \sum_{i=1}^{k} w_i h_i(x_j) \right)^2 + \sum_{i=1}^{k} \lambda_i |w_i| + \sum_{i=1}^{k} \mu_i w_i^2$$

wherein $w_i$ are an estimated effects of feature(i), $t(x_j)$ is a target value of observation(j), $h_i(x_j)$ is the observation(j)'s feature (i)'s value, $\lambda$ is a penalty parameter in an L1 regularization and $\mu$ is a penalty parameter in an L2 regularization.

11. The computer-readable medium of claim 8, wherein the using the trained demand model comprises: prediction=effect(X0)*effect(X1) . . . effect(X9), wherein effect(Xn) comprises a demand effect for feature n of the set of features.

12. The computer-readable medium of claim 8, wherein the early drop metric comprises a mean absolute percentage error.

13. The computer-readable medium of claim 8, further comprising:
 receiving a maximum iteration; and
 repeating the assigning each of the features, the assigning the penalty parameter, the training the demand algorithm and the evaluating the trained demand model until the maximum iteration is reached.

14. The computer-readable medium of claim 8, wherein the set of features include at least one of price, promotion, seasonality, brand, color or style, the forecasting further comprising:
 electronically sending the demand forecast to an inventory management system which determines quantities of the item to be shipped to each of a plurality of retail stores based on the demand forecast; and
 shipping the quantities of the item to each of the plurality of retail stores.

15. A retail item demand forecasting system for forecasting future demand for an item comprising:
 one or more processors coupled to one or more point of sale systems, the processors receiving historical sales data for the item comprising a plurality of data points;
 the processors further:
 defining a set of features for the item comprising a plurality of different features that correspond to the item;
 receiving a regression based demand algorithm for the item that includes the set of features as regression variables;
 splitting the data points into a training set and a testing set;
 assigning each of the features of the set of features into one of a plurality of different regularization categories;
 assigning a penalty parameter to each of the features subject to regularization, wherein each individual feature is assigned to a corresponding regularization category and a corresponding penalty;
 training the demand algorithm using the training set, the penalty parameters and the features to generate a trained demand model; and
 evaluating the trained demand model using the testing set to determine an early drop metric;
 repeating the assigning each of the features, the assigning the penalty parameter, the training the demand algorithm and the evaluating the trained demand model until the early drop metric meets a threshold, the repeating resulting in at least a first individual feature assigned to a second regularization category that is different than a previously assigned first regularization category, each of the first regularization category and the second regularization category comprising one of Lasso Regression (L1 regularization), Ridge Regression (L2 regularization) or Elastic Net regularization, and at least a second feature assigned to a second different penalty parameter than as previously assigned, the repeating causing the demand algorithm to be trained at least a second time based on newly assigned features and penalty parameters; and
 using the trained demand model, determining a demand forecast for the item, the demand forecast comprising a prediction of future sales data for the item.

16. The retail item demand forecasting system of claim 15, wherein the trained demand model comprises a relationship of demand to each of features of the set of features, and the system further comprising an inventory management system and a shipping system, the inventory management system determining quantities of the item to be shipped to each of a plurality of retail stores based on the demand forecast; and shipping the quantities of the item to each of the plurality of retail stores.

17. The retail item demand forecasting system of claim 15, wherein training the demand algorithm using the training set, the penalty parameters and the features to generate a trained demand model comprises:

$$w^* = \underset{w}{\operatorname{argmin}} \sum_j \left( t(x_j) - \sum_{i=1}^k w_i h_i(x_j) \right)^2 + \sum_{i=1}^k \lambda_i |w_i| + \sum_{i=1}^k \mu_i w_i^2$$

wherein $w_i$ are an estimated effects of feature(i), $t(x_j)$ is a target value of observation(j), $h_i(x_j)$ is the observation(j)'s feature (i)'s value, $\lambda$ is a penalty parameter in an L1 regularization and $\mu$ is a penalty parameter in an L2 regularization.

18. The retail item demand forecasting system of claim 15, wherein the set of features include at least one of price, promotion, seasonality, brand, color or style.

19. The retail item demand forecasting system of claim 15, wherein the using the trained demand model comprises:
prediction=effect(X0)*effect(X1) . . . effect(X9), wherein effect(Xn) comprises a demand effect for feature n of the set of features.

20. The retail item demand forecasting system of claim 15, the processors further:
receiving a maximum iteration; and
repeating the assigning each of the features, the assigning the penalty parameter, the training the demand algorithm and the evaluating the trained demand model until the maximum iteration is reached.

* * * * *